(12) United States Patent
Kim et al.

(10) Patent No.: US 8,455,600 B2
(45) Date of Patent: Jun. 4, 2013

(54) STYRENE-BUTADIENE COPOLYMER HIGHLY FUNCTIONALIZED WITH REACTIVE POLYOL AND MANUFACTURING METHOD THEREOF

(75) Inventors: Seung Su Kim, Seoul (KR); Gwanghoon Kwag, Daejeon (KR); Dong Hyuk Na, Daejeon (KR); Jun Keol Choi, Daejeon (KR); Seung Moo Huh, Daejeon (KR); Jeon Koo Lee, Daejeon (KR); Hye Min Kim, Gyeonggi-Do (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 49 days.

(21) Appl. No.: 13/085,279

(22) Filed: Apr. 12, 2011

(65) Prior Publication Data

US 2012/0165462 A1  Jun. 28, 2012

(30) Foreign Application Priority Data

Dec. 27, 2010  (KR) .................. 10-2010-0135936

(51) Int. Cl.
*C08L 25/10* (2006.01)
*C08L 25/14* (2006.01)
*C08L 9/06* (2006.01)
*B60C 1/00* (2006.01)

(52) U.S. Cl.
USPC ............ 526/329.1; 526/320; 526/329.2; 526/333; 524/575

(58) Field of Classification Search
USPC .................. 526/320, 329.1, 329.2, 333
See application file for complete search history.

(56) References Cited

U.S. PATENT DOCUMENTS

| | | | |
|---|---|---|---|
| 3,563,946 A | | 2/1971 | Miller et al. |
| 3,575,913 A | | 4/1971 | Meier |
| 4,064,081 A | | 12/1977 | McCoy et al. |
| 5,274,027 A | | 12/1993 | Guillaume et al. |
| 5,302,655 A | | 4/1994 | Guillaume et al. |
| 5,312,847 A | * | 5/1994 | de Vos ............... 521/137 |
| 6,512,053 B1 | | 1/2003 | Colvin et al. |
| 6,716,925 B2 | | 4/2004 | Thielen et al. |
| 2008/0287645 A1 | * | 11/2008 | Choi et al. ............ 528/366 |

* cited by examiner

*Primary Examiner* — Vu A Nguyen
(74) *Attorney, Agent, or Firm* — Frommer Lawrence & Haug LLP; Ronald R. Santucci

(57) ABSTRACT

Provided is a functional styrene-butadiene copolymer having superior silica affinity. The copolymer is prepared by radical polymerizing a styrene monomer, a butadiene monomer and a reactive polyol monomer in emulsion state in order to maximize the mixing effect when compounding with silica. When mixed with silica, the disclosed styrene-butadiene copolymer provides excellent wet traction and superior abrasion resistance, and is suitable to be used for an industrial material of snow tires, belts, hoses, etc.

7 Claims, 8 Drawing Sheets

STYRENE-BUTADIENE COPOLYMER HIGHLY FUNCTIONALIZED WITH REACTIVE POLYOL AND MANUFACTURING METHOD THEREOF

CROSS-REFERENCE TO RELATED APPLICATIONS

This application claims priority under 35 U.S.C. §119 to Korean Patent Application No. 10-2010-0135936, filed on Dec. 27, 2010, in the Korean Intellectual Property Office, the disclosure of which is incorporated herein by reference in its entirety.

BACKGROUND (a) Technical Field

The present disclosure relates to a styrene-butadiene copolymer functionalized styrene-butadiene copolymer by adding a reactive polyol during polymerization in order to improve affinity for silica, a method for preparing the same, and a silica composite containing the styrene-butadiene copolymer.

(b) Background Art

Styrene-butadiene copolymers or styrene-butadiene-polar monomer copolymers are mainly prepared by emulsion copolymerization. These copolymers are used for tires, coating materials, toners, or the like. Several patents are disclosed about the techniques of preparing the styrene-butadiene copolymer or the styrene-butadiene-polar monomer copolymer by emulsion copolymerization.

For example, U.S. Pat. Nos. 3,575,913 and 3,563,946 disclose preparation of a styrene-butadiene or styrene-butadiene-acrylate copolymer in emulsion state using potassium persulfate or azobisisobutyronitrile. U.S. Pat. No. 4,064,081 discloses emulsion polymerization of a butadiene-styrene copolymer using potassium persulfate as a polymerization initiator. U.S. Pat. Nos. 5,274,027 and 5,302,655 describe preparation of a styrene-butadiene-acrylate copolymer by emulsion polymerization from acrylate monomers such as itaconic acid, methyl methacrylate, etc. using, for example, an ammonium persulfate initiator.

U.S. Pat. Nos. 6,512,053 and 6,716,925 describe preparation of a styrene-butadiene-acrylate copolymer by emulsion polymerization from hydroxyalkyl acrylate monomers such as 2-hydroxyethyl methacrylate, 2-hydroxypropyl methacrylate and hydroxymethylmethacrylamide, using, for example, an ammonium persulfate initiator.

Those styrene-butadiene copolymers prepared by emulsion polymerization have poor affinity for silica and improvement of polarity is required to improve the affinity. However, since the vinyl carboxylic acid monomer is poorly reactive and interferes with micelle formation by changing acidity, there is a limitation in removing the residual monomers. In order to improve the silica affinity, it is required to increase the content of the polar monomer, which makes processing of the melt blend difficult. As a result, compound viscosity and hardness become very high, for example.

In the tire industry, the needs on styrene-butadiene rubbers having polar groups and silica composites with a structure suitable to make silica tires are increasing.

SUMMARY

The inventors of the present disclosure have studied to solve the silica affinity problem of the styrene-butadiene copolymer prepared by emulsion polymerization. As a result, they have found out that, when a reactive polyol is added in polymerizing a styrene-butadiene copolymer, the reactive polyol is introduced to the backbone of the styrene-butadiene copolymer while maintaining stability, resulting in improved polarity of the styrene-butadiene copolymer, thereby improving affinity for silica and optimizing blending property.

The present disclosure is directed to providing a functional styrene-butadiene copolymer having improved silica affinity and a method for preparing the same.

The present disclosure is also directed to providing a silica composite prepared by mixing the functional styrene-butadiene copolymer with silica.

In one general aspect, the present disclosure provides a functional styrene-butadiene copolymer selected from a group consisting of the compounds represented by Chemical Formulas 1 to 3:

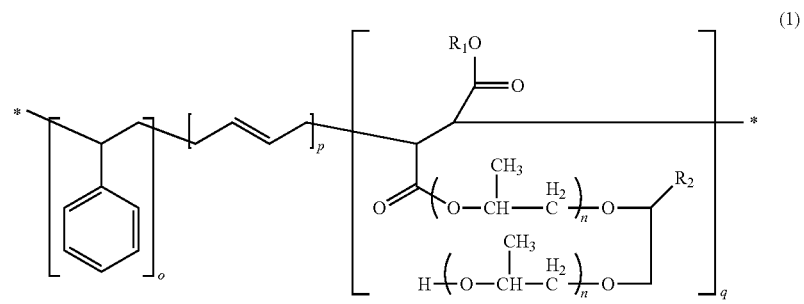

wherein o is from 0.1 to 0.5, p is from 0.40 to 0.85, q is from 0.01 to 0.10, o+p+q=1, n is independently from 1 to 100, $R_1$ is hydrogen or hydroxyethyl, and $R_2$ is hydrogen or $CH_3$;

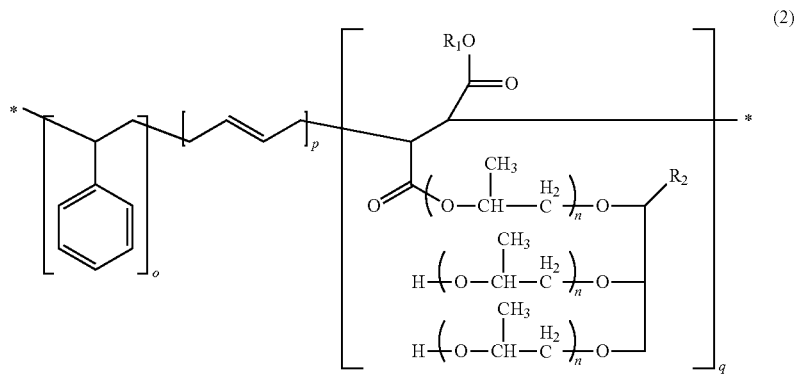

wherein o is from 0.1 to 0.5, p is from 0.40 to 0.85, q is from 0.01 to 0.10, o+p+q=1, n is independently from 1 to 100, and $R_1$ is hydrogen or hydroxyethyl; and

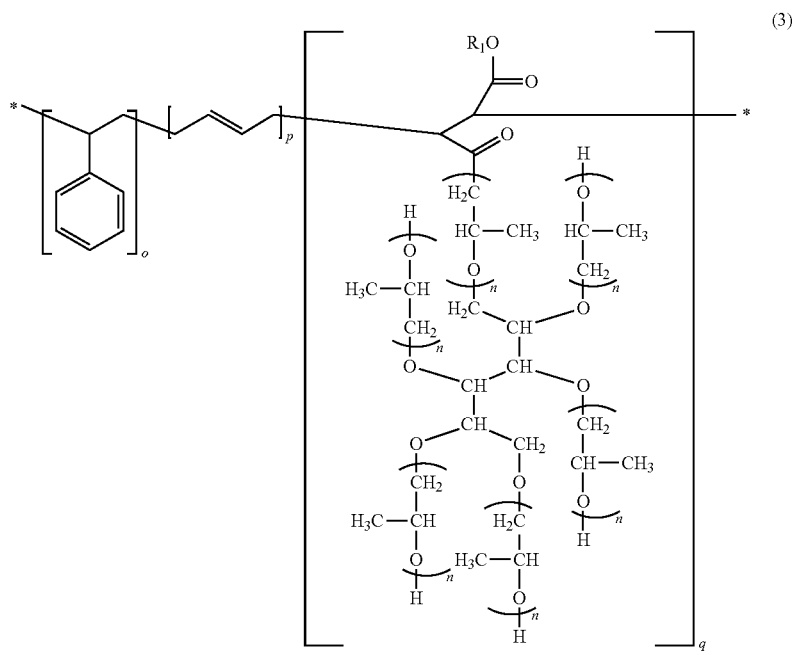

wherein o is from 0.1 to 0.5, p is from 0.40 to 0.85, q is from 0.01 to 0.10, o+p+q=1, n is independently from 1 to 100, and $R_1$ is hydrogen or hydroxyethyl.

In another general aspect, the present disclosure provides a silica composite which is a mixture of the functional styrene-butadiene copolymer with silica.

In another general aspect, the present disclosure provides a method for preparing a functional styrene-butadiene copolymer including polymerizing: a styrene monomer; a butadiene monomer; and one or more reactive polyol monomer(s) selected from the compounds represented by Chemical Formulas 4 to 6 in emulsion state:

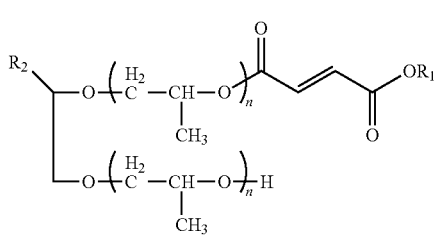

wherein n is independently from 1 to 100, $R_1$ is hydrogen or hydroxyethyl, and $R_2$ is hydrogen or $CH_3$;

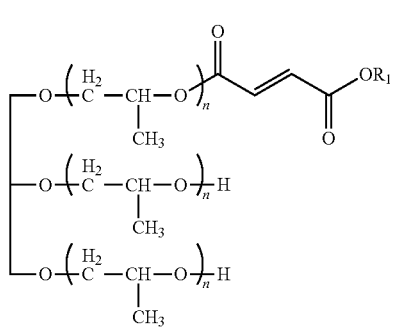

(5)

wherein n is independently from 1 to 100, $R_1$ and hydrogen or hydroxyethyl; and

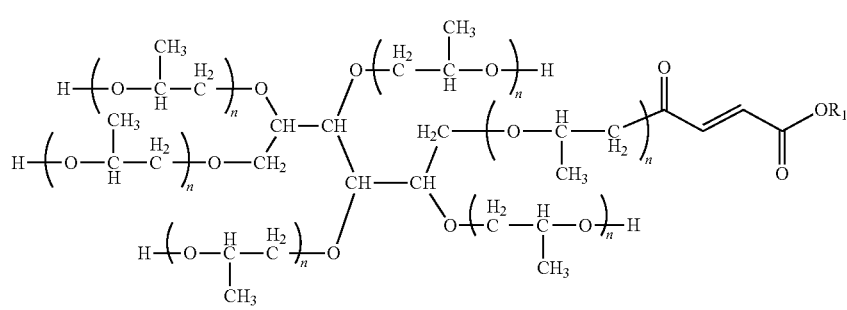

(6)

wherein n is independently from 1 to 100, and $R_1$ hydrogen or hydroxyethyl.

The above and other aspects and features of the present disclosure will be described infra.

BRIEF DESCRIPTION OF THE DRAWINGS

The above and other objects, features and advantages of the present disclosure will now be described in detail with reference to certain exemplary embodiments thereof illustrated in the accompanying drawings which are given hereinbelow by way of illustration only, and thus are not limitative of the disclosure, and wherein.

DETAILED DESCRIPTION

Figure 1:
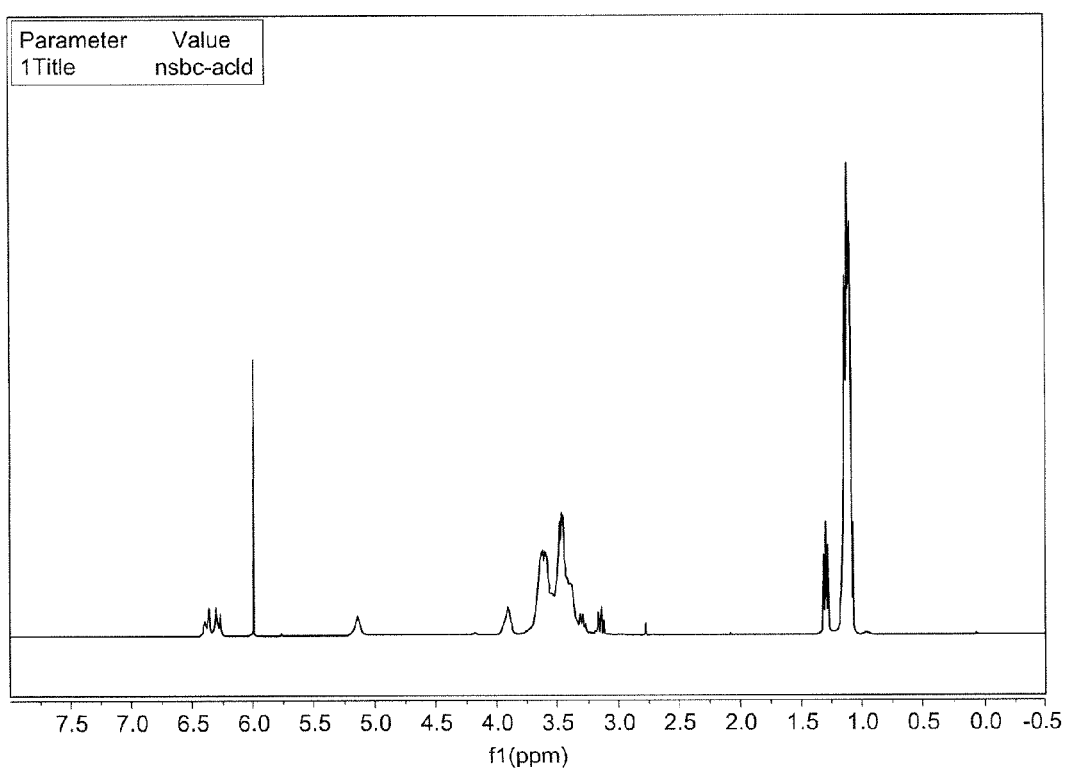
FIG. 1 is an NMR spectrum of a reactive polyol used in Example 1.

Hereinafter, reference will now be made in detail to various embodiments of the present disclosure, examples of which are illustrated in the accompanying drawings and described below. While the disclosure will be described in conjunction with exemplary embodiments, it will be understood that the present description is not intended to limit the disclosure to those exemplary embodiments. On the contrary, the disclosure is intended to cover not only the exemplary embodiments, but also various alternatives, modifications, equivalents and other embodiments, which may be included within the spirit and scope of the disclosure as defined by the appended claims.

The present disclosure provides a functional styrene-butadiene copolymer selected from a group consisting of the compounds represented by Chemical Formulas 1 to 3 which is prepared from polymerization of: a styrene monomer; a butadiene monomer; and one or more reactive polyol monomer(s) selected from the compounds represented by Chemical Formulas 4 to 6, and a silica composite comprising the same:

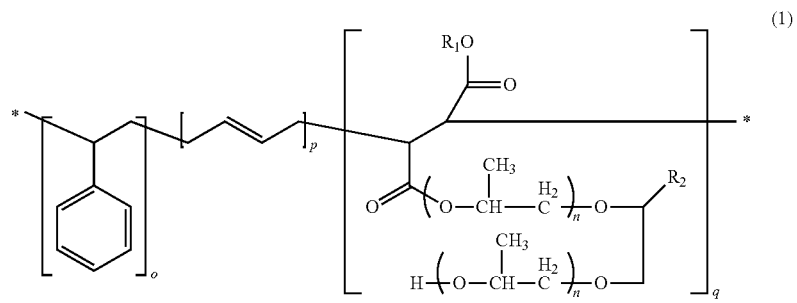

(1)

wherein o is from 0.1 to 0.5, p is from 0.40 to 0.85, q is from 0.01 to 0.10, o+p+q=1, n is independently from 1 to 100, $R_1$ is hydrogen or hydroxyethyl, and $R_2$ is hydrogen or $CH_3$;

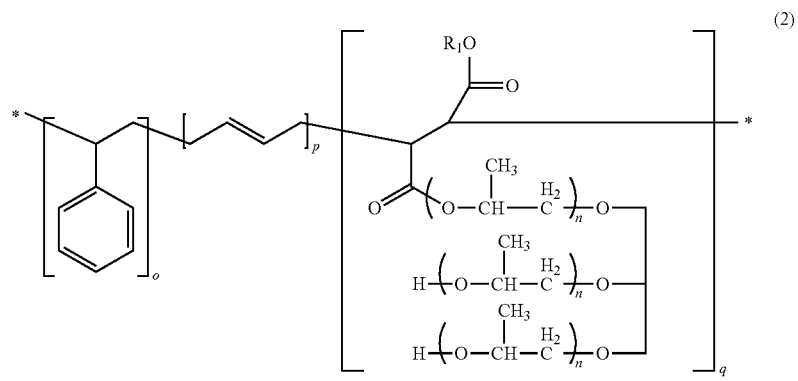

(2)

wherein o is from 0.1 to 0.5, p is from 0.40 to 0.85, q is from 0.01 to 0.10, o+p+q=1, n is independently from 1 to 100, and $R_1$ is hydrogen or hydroxyethyl;

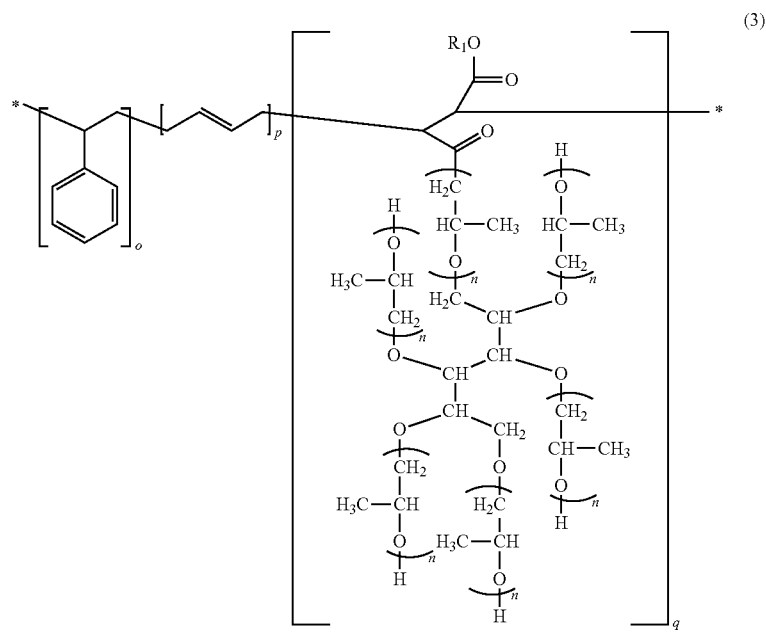

(3)

wherein o is from 0.1 to 0.5, p is from 0.40 to 0.85, q is from 0.01 to 0.10, o+p+q=1, n is independently from 1 to 100, and $R_1$ is hydrogen or hydroxyethyl;

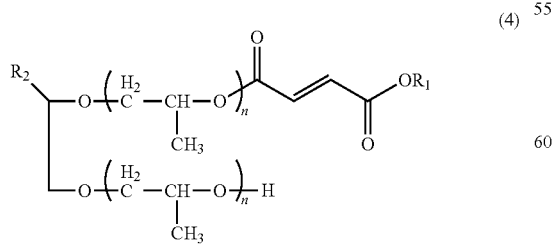

(4)

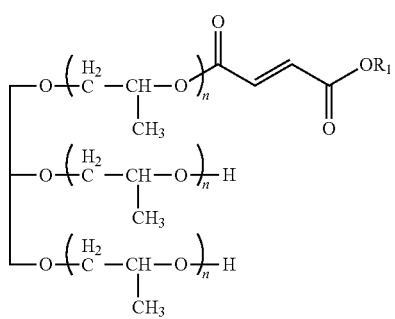

(5)

wherein n is independently from 1 to 100, $R_1$ is hydrogen or hydroxyethyl, and $R_2$ is hydrogen or $CH_3$;

wherein n is independently from 1 to 100, $R_1$ and hydrogen or hydroxyethyl; and (6)

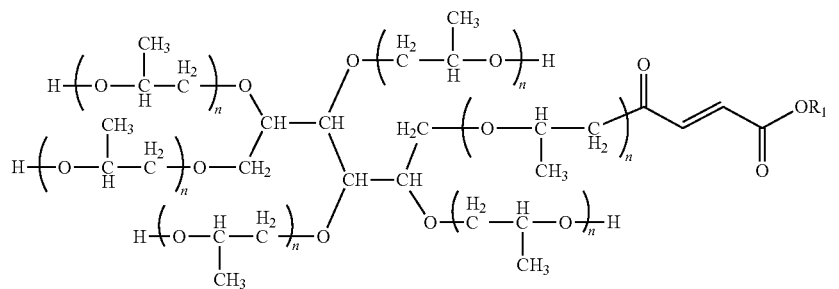

wherein n is independently from 1 to 100, and $R_1$ hydrogen or hydroxyethyl.

The components of the functional styrene-butadiene copolymer of the present disclosure will be described in detail.

First, among the monomers used in the polymerization, the styrene monomer is not particularly limited, but may be one or more selected from styrene, monochlorostyrene, methylstyrene and dimethylstyrene. It may be used in an amount of 10-50 wt % based on the weight of the total monomers. When the amount is less than 10 wt %, mechanical properties including tensile property may be unsatisfactory. When the amount exceeds 50 wt %, elasticity and abrasion resistance may be unsatisfactory. Hence, the aforesaid range may be preferred.

The butadiene monomer is not particularly limited, but may be one or more selected from 1,3-butadiene, chlorobutadiene and isoprene. The butadiene monomer may be used in an amount of 45-85 wt % based on the weight of the total monomers. When the amount is less than 45 wt %, elasticity and abrasion resistance may be unsatisfactory. When the amount exceeds 85 wt %, mechanical properties including tensile property may be unsatisfactory. Hence, the aforesaid range may be preferred. In the resultant copolymer, the butadiene unit may have a trans or cis, vinyl microstructure.

The reactive polyol monomer represented by Chemical Formula 4, 5 or 6 may be a polypropylene glycol with a reactive double bond introduced or a polyalkylene glycol with a reactive double bond introduced. It may be used in an amount of 0.1-10 wt %, specifically 1-5 wt %, based on the weight of the total monomers. When the amount of the reactive polyol monomer is less than 0.1 wt %, it is difficult to confer hydrophilic property to the styrene-butadiene copolymer. When the amount exceeds 10 wt %, elasticity may decrease and processability may be unsatisfactory due to increased hardness. Hence, the aforesaid range may be preferred. Further, the reactive polyol monomer may have an average molecular weight from 300 to 30,000. When the average molecular weight is smaller than 300, silica affinity may be insufficient due to low polarity, resulting in unsatisfactory tire properties. And, when it exceeds 30,000, fluidity may be unsatisfactory because of too high viscosity. Hence, the aforesaid range may be preferred.

The reactive polyol monomer represented by Chemical Formula 4, 5 or 6 is prepared from a reaction of a polyol or a combination thereof with an alkylene oxide. For example, a polyol selected from a group consisting of a mixture of sugar and glycerin, sorbitol, a mixture of sugar and pentaerythritol, glycerin, propylene glycol and ethylene glycol may be reacted with an alkylene oxide to prepare the reactive polyol monomer. More specifically, it may be prepared from anion polymerization of a polyol with an alkylene oxide using a strong base compound such as potassium hydroxide or sodium hydroxide as a catalyst. In the present disclosure, the reactive polyol monomer is added during the polymerization in order to maximize the polarity of the styrene-butadiene copolymer and thus to solve the silica affinity problem of the existing styrene-butadiene copolymer.

More specifically, an acrylonitrile monomer may be further added in addition to the aforesaid monomers. For example, the acrylonitrile monomer may be one or more selected from methacrylonitrile, ethacrylonitrile and crotononitrile. The acrylonitrile may be used in an amount of 0.01-10 wt % based on the weight of the total monomers. When the amount is less than 0.01 wt %, it is difficult to confer hydrophilic property to the styrene-butadiene copolymer. When the amount exceeds 10 wt %, elasticity may decrease and processability may be unsatisfactory due to increased hardness. Hence, the aforesaid range may be preferred.

For the polymerization of the monomers, a radical initiator, an emulsifier, a mercaptan-based molecular weight control agent, a polymerization terminator, etc. are used. The radical initiator may be one commonly used in the related art. Specifically, one or more selected from the initiator systems commonly used in emulsion polymerization, e.g., persulfate such as potassium persulfate and ammonium persulfate, acetylacetone peroxide, benzyl peroxide, dicumyl peroxide, methane hydroperoxide, 2,4-dichlorobenzyl peroxide, t-butyl peracetate, 2,2'-azobis(isobutyramidine) dihydrochloride, azobisisobutyronitrile, hydrogen peroxide, redox system and ferrous sulfate, may be used. When preparing the styrene-butadiene copolymer according to the present disclosure, the radical initiator may be used in an amount of 0.05-3 parts by weight based on 100 parts of the total monomers by weight. When the radical initiator is used in an amount less than 0.05 part by weight, polymerization may not proceed sufficiently. And, when it is used in excess of 3 parts by weight, molecular weight may decrease.

The emulsifier may be an anionic, cationic or non-ionic surfactant. Specifically, one or more selected from metal salts and ammonium salts may be used. Specifically, one or more selected from an alkyl sulfate metal salt, an alkylallylsulfonic acid metal salt, an alkyl phosphate metal salt, an alkyl sulfate ammonium salt, an alkylallylsulfonic acid ammonium salt, an alkylarylsulfonic acid ammonium salt, an allylsulfonic acid ammonium salt and an alkyl phosphate ammonium salt may be used. More specifically, one or more selected from dodecylbenzenesulfonic acid, rosin acid, fatty acid, lauryl sulfonic acid and hexadecylsulfonic acid may be used. Here, each of the alkyl, allyl and aryl acid may have 5-20 carbon atoms. When the number of carbon atoms is smaller than 5, dispersing may be insufficient. And, when it exceeds 20, hydrophilicity may decrease. Hence, the aforesaid range may be preferred. When preparing the styrene-butadiene copolymer according to the present disclosure, the emulsifier may be used in an amount of 0.1-10 parts by weight based on 100 parts of the total monomers by weight. When the emulsifier is used in an amount less than 0.1 part by weight, micelles may not form. And, when it is used in excess of 10 parts by weight microemulsion may be formed, thus resulting in a small molecular weight. Hence, the aforesaid range may be preferred.

The mercaptan-based molecular weight control agent may be a $C_8$-$C_{20}$ thiol. Specifically, one or more selected from octanethiol, decanethiol, dodecanethiol and hexadecanethiol may be used. The average molecular weight of the styrene-butadiene copolymer may be controlled by controlling the amount of the molecular weight control agent. When the mercaptan-based molecular weight control agent is used in an amount of 0.001-0.1 part by weight based on 100 parts of the total monomers by weight, a styrene-butadiene copolymer having a large molecular weight may be prepared. When it is used in an amount of 0.5-2 parts by weight, a styrene-butadiene copolymer having a small molecular weight may be prepared. When the mercaptan-based molecular weight control agent is used in an amount less than 0.001 part by weight, gelation may occur. And, when it is used in excess of 2 parts by weight, physical properties may be unsatisfactory. Hence, the aforesaid range may be preferred. The resultant styrene-butadiene copolymer may have a weight average molecular weight from 100,000 to 3,000,000 g/mol. When the weight average molecular weight is smaller than 100,000 g/mol, properties may be unsatisfactory. And, when it exceeds 3,000,000 g/mol, processing may be difficult due to increased compound viscosity and hardness.

The polymerization terminator may be diethylhydroxyamine, N-isopropylhydroxyamine, monoethylhydroxyamine, sodium dimethyldithiocarbamate, or the like. Specifically, the polymerization terminator may be used in an amount of 0.01-2 parts by weight based on 100 parts of the total monomers by weight. When it is used in an amount less than 0.01 part by weight, termination of the reaction may be difficult and gelation may occur. And, when it is used in excess of 2 parts by weight, the unreacted polymerization terminator may give off offensive odor. Also, the polymerization terminator is harmful to the human body. Hence, the aforesaid range may be preferred.

The silica composite of the present disclosure prepared by mixing the functional styrene-butadiene copolymer with silica has superior tensile property, abrasion resistance and wet traction (tan δ, 0° C.), and thus is very suitable to be sued as an industrial material for tires, belts, hoses, etc. When preparing the silica composite, the silica may be added in an amount of 30-100 parts by weight based on 100 parts of the functional styrene-butadiene copolymer of the present disclosure by weight. When the silica is used in an amount less than 30 parts by weight, mechanical properties may be unsatisfactory due to low silica content. And, when the silica is used in an amount exceeding 100 parts by weight, processing may be difficult because of increased Mooney viscosity. Hence, the aforesaid range may be preferred.

The present disclosure also provides a method for preparing the functional styrene-butadiene copolymer represented by Chemical Formula 1, 2 or 3 comprising radical polymerizing: styrene; butadiene; and one or more reactive polyol monomer(s) selected from the compounds represented by Chemical Formulas 4 to 6 in emulsion state. The components and composition thereof are the same as described above.

The functional styrene-butadiene copolymer is prepared by radical polymerizing styrene, butadiene and the one or more reactive polyol monomer(s) selected from the compounds represented by Chemical Formulas 4 to 6 in emulsion state at 0-70° C. for 4-48 hours, and has a weight average molecular weight from 100,000 to 2,000,000 g/mol. As described earlier, the molecular weight of the styrene-butadiene copolymer may be controlled by controlling the amount of the molecular weight control agent. When superior elasticity and mechanical properties are desired, a styrene-butadiene copolymer with a large molecular weight may be prepared. And, when improved processability is desired, a styrene-butadiene copolymer with a small molecular weight may be prepared. When the reaction temperature is below 0° C., reactivity of the emulsion polymerization may be unsatisfactory. And, when it exceeds 70° C., gelation may occur during the polymerization.

Thus prepared functional styrene-butadiene copolymer represented by Chemical Formula 1, 2 or 3 has a nano-scale size of 20-200 nm. When the size is smaller than 20 nm, molecular weight may be too small. And, when it exceeds 200 nm, gelation and coagulation may occur. Hence, the aforesaid range may be preferred. The resultant styrene-butadiene copolymer has a weight average molecular weight from 200,000 to 3,000,000 g/mol. When the weight average molecular weight is smaller than 200,000 g/mol, physical properties may be unsatisfactory. And, when it exceeds 3,000,000 g/mol, gelation may occur and processing may be difficult due to increased hardness.

EXAMPLES

The examples and experiments will now be described. The following examples and experiments are for illustrative purposes only and not intended to limit the scope of this disclosure.

Example 1

Figure 2:
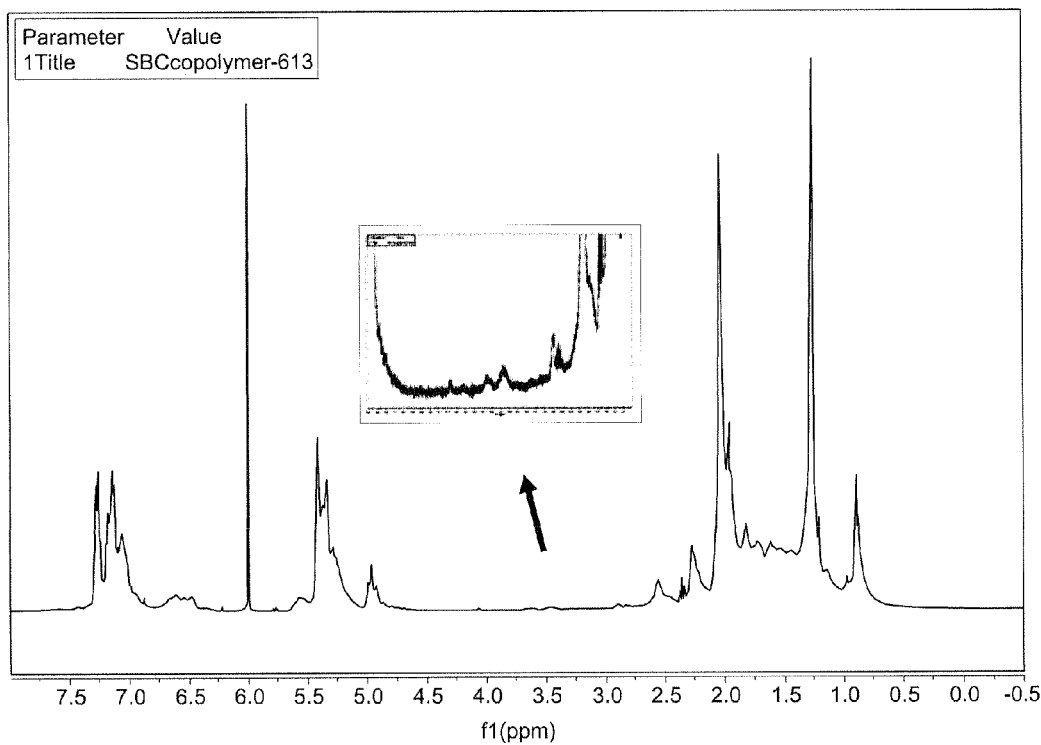
FIG. 2 is an NMR spectrum of a styrene-butadiene-reactive polyol copolymer prepared in Example 1.

Water (1600 mL), potassium rosinate (23 g), fatty acid potassium salt (37 g), potassium chloride (3.5 g), styrene (480 g), a reactive polyol[1] represented by Chemical Formula 4 and having a molecular weight of 400 (30 g), 1,3-butadiene (490 g), EDTA (0.5 g), sodium hydrosulfite (0.3 g), ferrous sulfate (0.1 g), sodium formaldehyde sulfonate (0.4 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene-reactive polyol copolymer having a weight average molecular weight of 1,010,000 g/mol was prepared. The NMR spectrum of the copolymer is shown in FIG. 2.

[1] The reactive polyol used in Example 1 is represented by Chemical Formula 4 and may be synthesized as follows.

After reacting propylene glycol with propylene oxide, maleic anhydride is added to confer reactivity. Due to the terminal hydroxyl group, the resulting reactive polyol has affinity for silica filler. The finally obtained reactive polyol has a molecular weight of 400 (see FIG. 1).

Example 2

Figure 3:
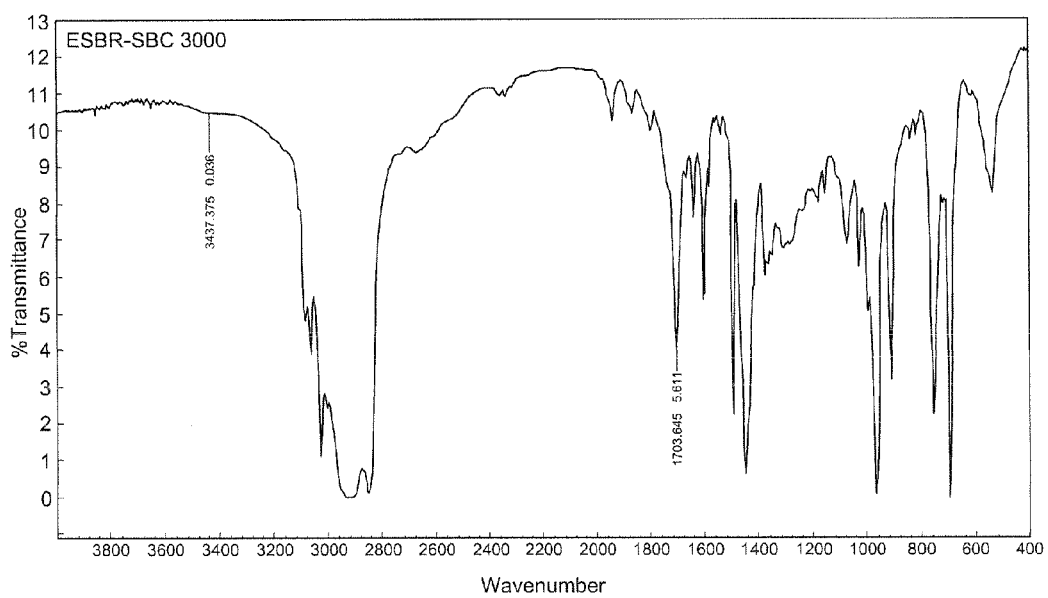
FIG. 3 is an IR spectrum of a styrene-butadiene-reactive polyol copolymer prepared in Example 2.

Water (1600 mL), potassium rosinate (23 g), fatty acid potassium salt (37 g), potassium chloride (3.5 g), styrene (480 g), a reactive polyol[2] represented by Chemical Formula 5 and having a molecular weight of 3000 (30 g), 1,3-butadiene (490 g), EDTA (0.5 g), sodium hydrosulfite (0.3 g), ferrous sulfate (0.1 g), sodium formaldehyde sulfonate (0.4 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene-reactive polyol copolymer having a weight average molecular weight of 950,000 g/mol was prepared. The IR spectrum of the copolymer is shown in FIG. 3.

[2] The reactive polyol used in Example 2 is represented by Chemical Formula 5 and may be synthesized as follows.

After reacting glycerol with propylene oxide, maleic anhydride is added to confer reactivity. Due to the terminal hydroxyl group, the resulting reactive polyol has affinity for silica filler. The finally obtained reactive polyol has a molecular weight of 3000.

Example 3

Figure 4:
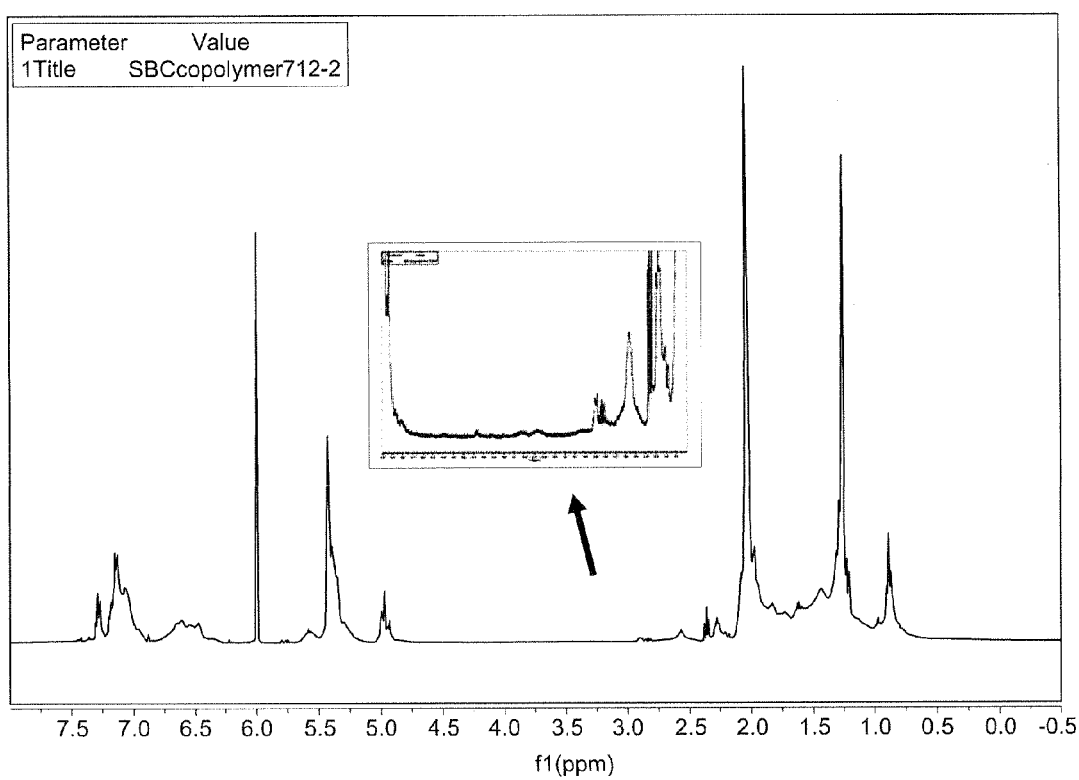
FIG. 4 is an NMR spectrum of a styrene-butadiene-reactive polyol copolymer prepared in Example 3.

Water (1600 mL), potassium rosinate (23 g), fatty acid potassium salt (37 g), potassium chloride (3.5 g), styrene (480 g), a reactive polyol[3] represented by Chemical Formula 6 and having a molecular weight of 9000 (30 g), 1,3-butadiene (490 g), EDTA (0.5 g), sodium hydrosulfite (0.3 g), ferrous sulfate (0.1 g), sodium formaldehyde sulfonate (0.4 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene-reactive polyol copolymer having a weight average molecular weight of 975,000 g/mol was prepared. The NMR spectrum of the copolymer is shown in FIG. 4.

[3] The reactive polyol used in Example 3 is represented by Chemical Formula 6 and may be synthesized as follows.

After reacting sorbitol with propylene oxide, maleic anhydride is added to confer reactivity. Due to the terminal hydroxyl group, the resulting reactive polyol has affinity for silica filler. The finally obtained reactive polyol has a molecular weight of 9000.

Example 4

Figure 5:
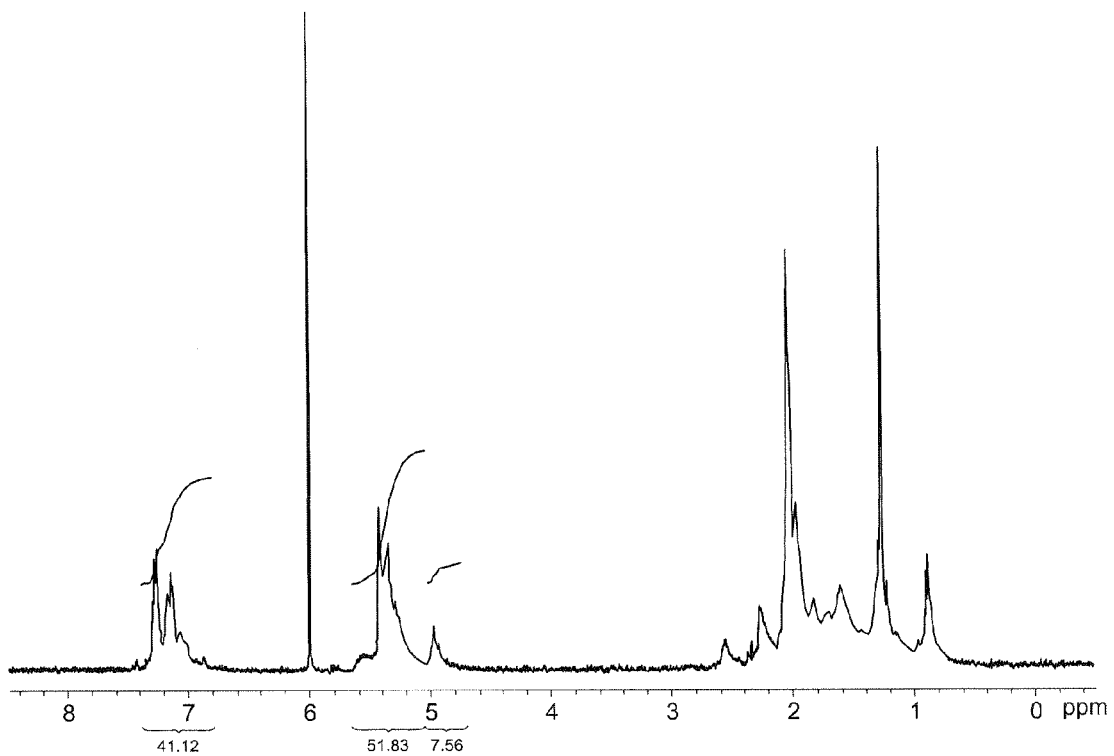
FIG. 5 is an NMR spectrum of a styrene-butadiene-acrylonitrile-reactive polyol copolymer prepared in Example 4.

Water (1600 mL), potassium rosinate (23 g), fatty acid potassium salt (37 g), potassium chloride (3.5 g), styrene (450 g), acrylonitrile (30 g), the reactive polyol[1] represented by Chemical Formula 4 and having a molecular weight of 400 (30 g), 1,3-butadiene (490 g), EDTA (0.5 g), sodium hydrosulfite (0.3 g), ferrous sulfate (0.1 g), sodium formaldehyde sulfonate (0.4 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene-acrylonitrile-reactive polyol copolymer having a weight average molecular weight of 920,000 g/mol was prepared. The NMR spectrum of the copolymer is shown in FIG. 5.

[1] The reactive polyol used in Example 1 is represented by Chemical Formula 4 and may be synthesized as follows.

Example 5

Figure 6:
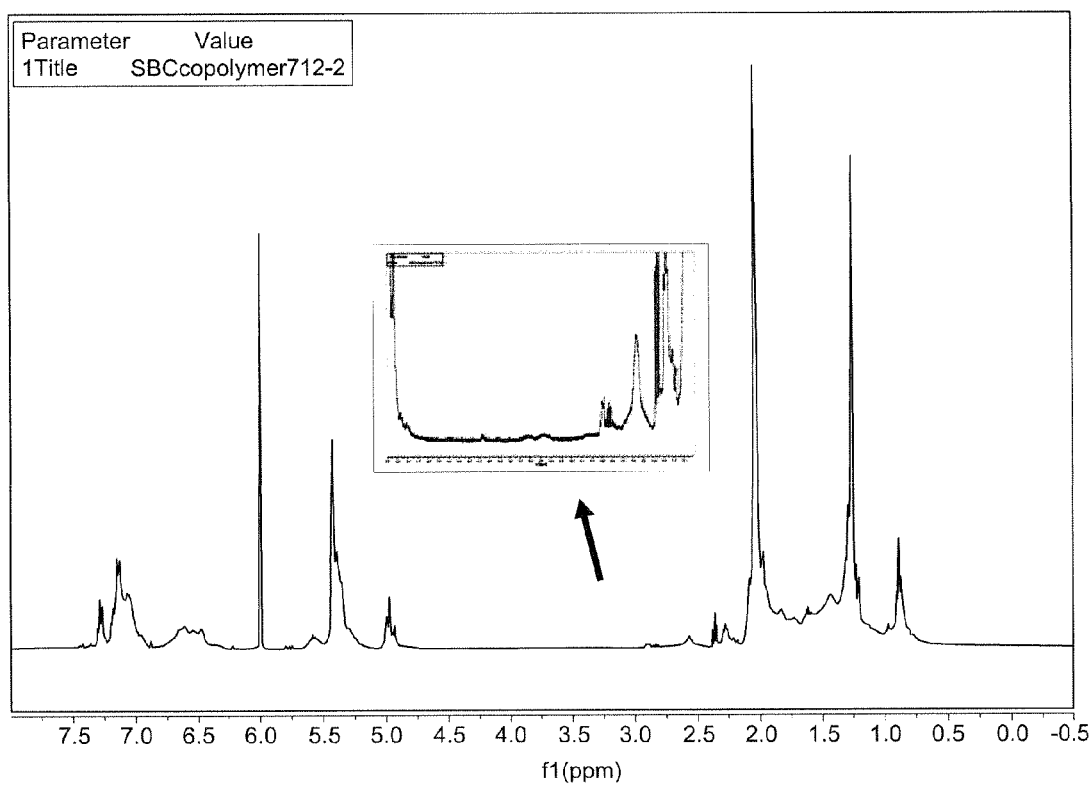
FIG. 6 is an NMR spectrum of a styrene-butadiene-acrylonitrile-reactive polyol copolymer prepared in Example 5.

Water (1600 mL), potassium rosinate (23 g), fatty acid potassium salt (37 g), potassium chloride (3.5 g), styrene (430 g), acrylonitrile (50 g), the reactive polyols) represented by Chemical Formula 4 and having a molecular weight of 400 (30 g), 1,3-butadiene (490 g), EDTA (0.5 g), sodium hydrosulfite (0.3 g), ferrous sulfate (0.1 g), sodium formaldehyde sulfonate (0.4 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene-acrylonitrile-reactive polyol copolymer having a weight average molecular weight of 930,000 g/mol was prepared. The NMR spectrum of the copolymer is shown in FIG. 6.

Comparative Example 1

Figure 7:
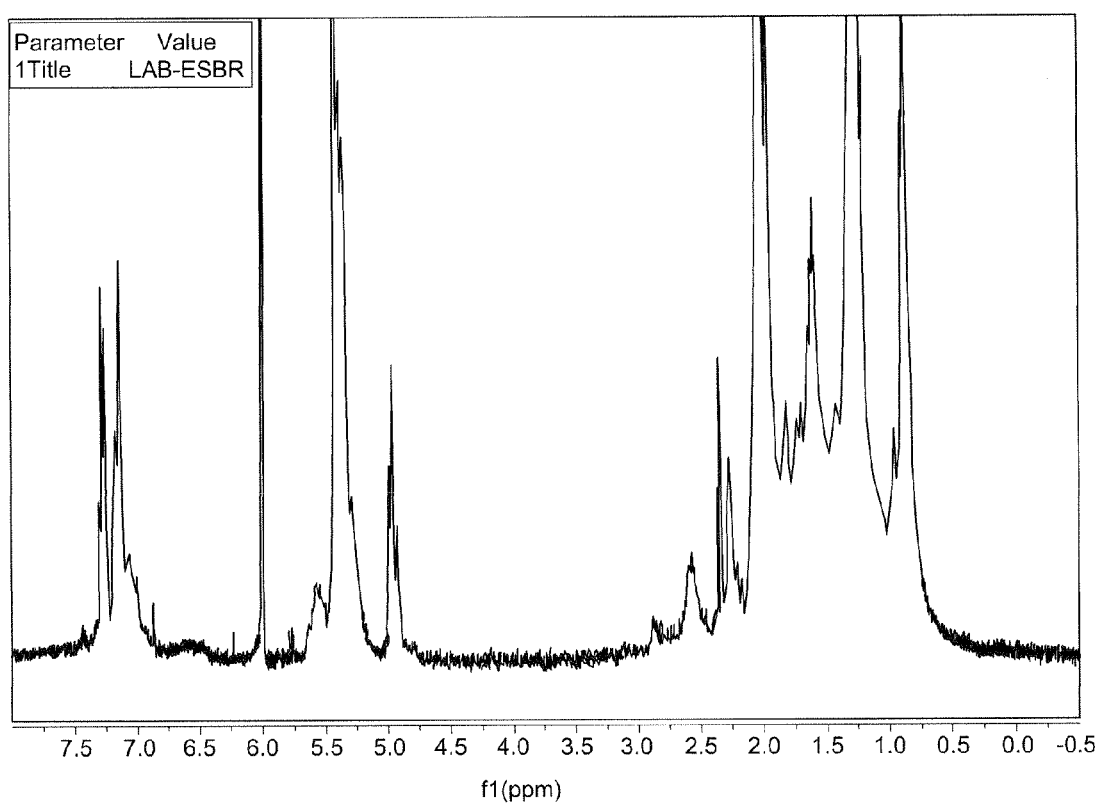
FIG. 7 is an NMR spectrum of a styrene-butadiene copolymer prepared in Comparative Example 1.

Water (1600 mL), potassium rosinate (23 g), fatty acid potassium salt (37 g), potassium chloride (3.5 g), styrene (480 g), 1,3-butadiene (520 g), EDTA (0.5 g), sodium hydrosulfite (0.5 g), ferrous sulfate (0.1 g), sodium formaldehyde sulfonate (0.3 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene copolymer having a weight average molecular weight of 945,000 g/mol was prepared. The NMR spectrum of the copolymer is shown in FIG. 7.

Comparative Example 2

Figure 8:
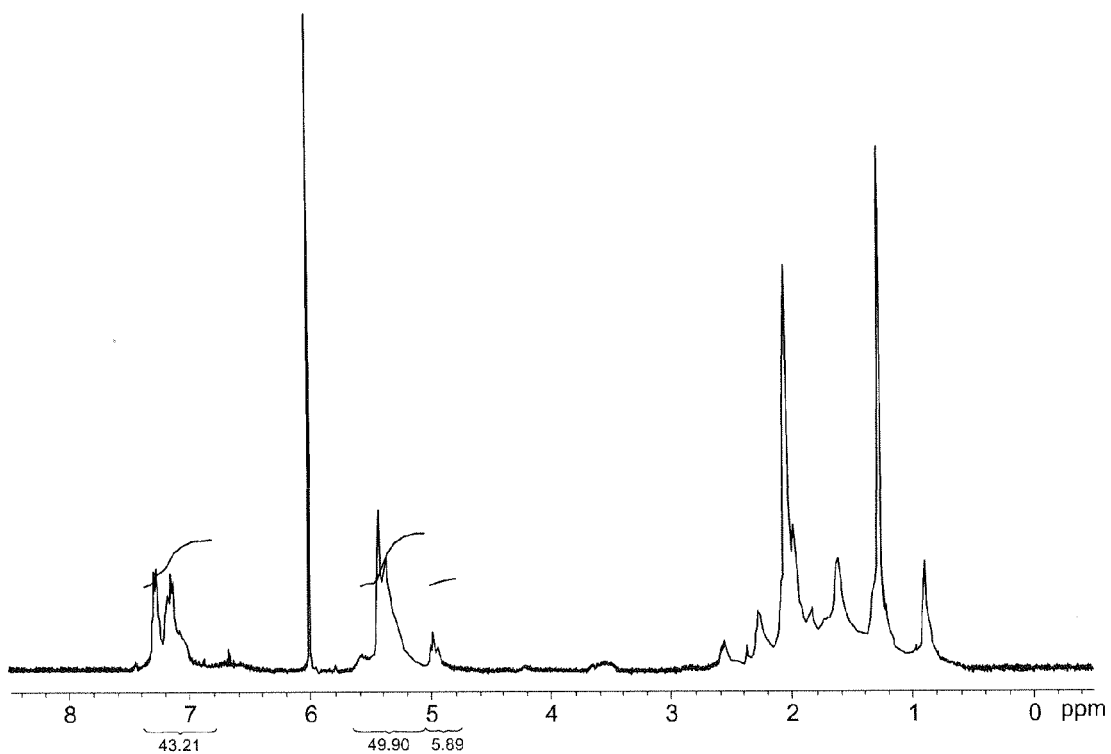
FIG. 8 is an NMR spectrum of a styrene-butadiene-ethoxyethoxyethyl acrylate copolymer prepared in Comparative Example 2.

Water (1600 mL), potassium rosinate (23 g), fatty acid potassium salt (37 g), potassium chloride (3.5 g), styrene (450 g), ethoxyethoxyethyl acrylate (30 g), acrylonitrile (30 g), 1,3-butadiene (490 g), EDTA (0.5 g), sodium hydrosulfite (0.5 g), ferrous sulfate (0.1 g), sodium formaldehyde sulfonate (0.5 g), dodecanethiol (1.0 g) and methane hydroperoxide (0.6 g) were continuously added to a 5-L pressurized reactor and stirred for 8 hours at 10° C. Then, diethylhydroxyamine (1.0 g) was added to terminate the reaction. After stripping and drying, a styrene-butadiene-ethoxyethoxyethyl acrylate copolymer having a weight average molecular weight of 1,043,000 g/mol was prepared. The NMR spectrum of the copolymer is shown in FIG. 8.

Comparative Example 3

Figure 9:
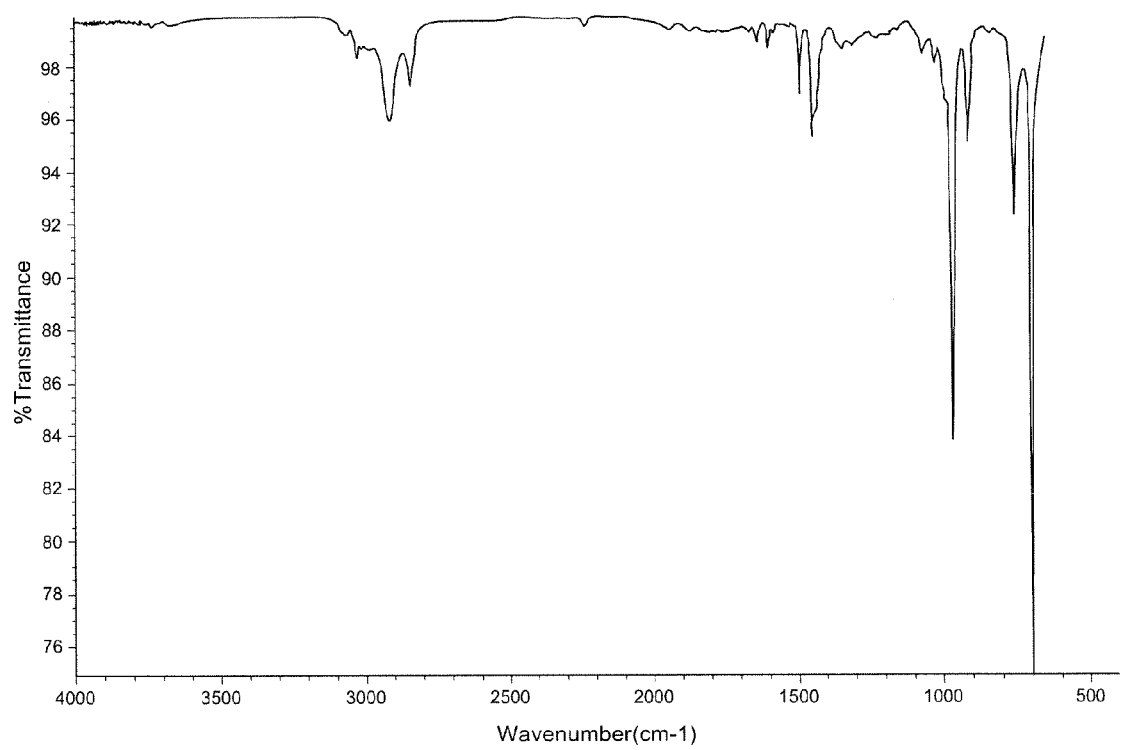
FIG. 9 is an IR spectrum of a styrene-butadiene-acrylonitrile copolymer prepared in Comparative Example 3.

Water (1600 mL), potassium rosinate (23 g), fatty acid potassium salt (37 g), potassium chloride (3.5 g), styrene (400 g), acrylonitrile (60 g), 1,3-butadiene (540 g), EDTA (0.5 g), sodium hydrosulfite (0.5 g), ferrous sulfate (0.1 g), sodium formaldehyde sulfonate (0.5 g), dodecanethiol (1.0 g) and methane hydroperoxide (1.0 g) were continuously added to a 5-L pressurized reactor and stirred for 8 hours at 10° C. Then, diethylhydroxyamine (1.0 g) was added to terminate the reaction. After stripping and drying, a styrene-butadiene-ethoxyethoxyethyl acrylate copolymer having a weight average molecular weight of 1,103,000 g/mol was prepared. The IR spectrum of the copolymer is shown in FIG. 9.

Preparation Example

Preparation of Tire Tread Sheet

The copolymer of Examples 1-5 (100 g), a process oil (37.5 g), zinc oxide (3 g), stearic acid (2 g), silica (Zeosil 175, 70 g), bis(triethoxysilylpropyl)tetrasulfide (Si69, 5.6 g) and an antioxidant (6-PPD, 1 g) were sequentially added to an internal mixer (Banbury mixer). After mixing at 130° C. and at 60 rpm for 6.5 minutes, the processing temperature was cooled to 50° C. Then, sulfur (2 g) and a vulcanization accelerator (N-cyclohexyl-2-benzothiazylsulfonamide, 3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm$^2$ or greater for 10 minutes, a test specimen in the form of a 2-mm thick sheet was prepared.

Comparative Preparation Example

Preparation of Tire Tread Sheet

The copolymer of Comparative Examples 1-3 (100 g), a process oil (37.5 g), zinc oxide (3 g), stearic acid (2 g), silica (Zeosil 175, 70 g), bis(triethoxysilylpropyl)tetrasulfide (5.6 g) and an antioxidant (1 g) were sequentially added to an internal mixer (Banbury mixer). After mixing at 130° C. and at 60 rpm for 6.5 minutes, the processing temperature was cooled to 50° C. Then, sulfur (2 g) and a vulcanization accelerator (N-cyclohexyl-2-benzothiazylsulfonamide, 3 g) were mixed with the resulting mixture by stirring for 3 minutes at 60° C. and at 50 rpm. Then, after shaping into a flat sheet on a 2-mm thick roll, the resulting sheet was allowed to stand for 24 hours. After vulcanization on a hot press at 160° C. by applying a pressure of 160 kgf/cm$^2$ or greater for 10 minutes, a test specimen in the form of a 2-mm thick sheet was prepared.

Test Example

Measurement of Physical Properties

Physical properties of the test specimens prepared in Preparation Examples and Comparative Preparation Example were measured. The result is given in Tables 1 and 2. Processability was evaluated by comparing the compound Mooney viscosity. Tensile properties were measured according to ASTM D412. Abrasion property was measured according to the DIN method. And, wet traction was measured according to the hysteresis (tan δ) method.

TABLE 1

|  |  | Preparation Example | | | | |
|---|---|---|---|---|---|---|
|  |  | Ex. 1 | Ex. 2 | Ex. 3 | Ex. 4 | Ex. 5 |
| Components | SBR1[1] | 100.0 | — | — | — | — |
|  | SBR2[1] | — | 100.0 | — | — | — |
|  | SBR3[1] | — | — | 100.0 | — | — |
|  | SBR4[1] | — | — | — | 100.0 | — |
|  | SBR5[1] | — | — | — | — | 100.0 |
|  | Silica[2] | 70.0 | 70.0 | 70.0 | 70.0 | 70.0 |
|  | SI-69[3] | 5.6 | 5.6 | 5.6 | 5.6 | 5.6 |
|  | ZnO#S | 3.0 | 3.0 | 3.0 | 3.0 | 3.0 |
|  | Stearic acid | 2.0 | 2.0 | 2.0 | 2.0 | 2.0 |
| Tensile properties | Hardness | 75 | 76 | 79 | 78 | 79 |
|  | Modulus 50% (kgf/cm$^2$) | 23 | 24 | 28 | 28 | 32 |
|  | Modulus 100% (kgf/cm$^2$) | 44 | 44 | 54 | 50 | 59 |
|  | Modulus 300% (kgf/cm$^2$) | 187 | 198 | 205 | 212 | 230 |
|  | T.S. (kgf/cm$^2$) | 216 | 217 | 224 | 235 | 250 |
|  | E.B. (%) | 344 | 349 | 340 | 350 | 310 |
| Abrasion property (DIN) | Abrasion amount (g) | 0.1015 | 0.1030 | 0.0935 | 0.0920 | 0.0910 |
| Wet traction (Gabo) | $T_g$ (° C.) | −10.9 | −8.8 | −14.3 | −10.7 | −10.8 |
|  | Tan δ (0° C.) | 0.5767 | 0.562 | 0.5485 | 0.5974 | 0.5706 |
|  | Tan δ (60° C.) | 0.1257 | 0.1205 | 0.1253 | 0.112 | 0.1101 |

[1] SBR#: Copolymer prepared in each Example
[2] Silica: Precipitated silica (Zeosil 175, Rhodia)
[3] SI-69: Bis(triethoxysilylpropyl)tetrasulfide

TABLE 2

|  |  | Comparative Preparation Example | | |
|---|---|---|---|---|
|  |  | Comp. Ex. 1 | Comp. Ex. 2 | Comp. Ex. 3 |
| Components | SBR-R1[1] | 100.0 | — | — |
|  | SBR-R2[1] | — | 100.0 | — |
|  | SBR-R3[1] | — | — | 100.0 |
|  | silica[2] | 70.0 | 70.0 | 70.0 |
|  | SI-69[3] | 5.6 | 5.6 | 5.6 |
|  | ZnO#S | 3.0 | 3.0 | 3.0 |
|  | Stearic acid | 2.0 | 2.0 | 2.0 |
| Tensile properties | Hardness | 80 | 81 | 79 |
|  | Modulus 50% (kgf/cm$^2$) | 23 | 25 | 28 |
|  | Modulus 100% (kgf/cm$^2$) | 44 | 67 | 69 |
|  | Modulus 300% (kgf/cm$^2$) | 165 | 0 | 0 |
|  | T.S. (kgf/cm$^2$) | 165 | 200 | 184 |
|  | E.B. (%) | 300 | 264 | 245 |
| Abrasion property (DIN) | Abrasion amount (g) | 0.1230 | 0.1220 | 0.1295 |
| Wet traction (Gabo) | $T_g$ (° C.) | −12.6 | −10.9 | −11.6 |
|  | Tan δ (0° C.) | 0.4702 | 0.4562 | 0.4213 |
|  | Tan δ (60° C.) | 0.1387 | 0.1466 | 0.1413 |

[1] SBR-R#: Copolymer prepared in each Comparative Example
[2] Silica: Precipitated silica (Zeosil 175, Rhodia)
[3] SI-69: Bis(triethoxysilylpropyl)tetrasulfide In general, the traction of a tire can be predicted from the tan δ value at 0° C. It is known that a higher tan δ value indicates a better traction. The index of rolling resistance can be predicted from the tan δ value at 60° C. It is known that a lower tan δ value is translated into better the index of rolling resistance. As seen from Tables 1 and 2, Preparation Example (wherein the copolymers of Examples 1-5 were used) exhibited better processability, which results from improved silica affinity, better tensile properties, abrasion resistance, wet traction (tan δ at 0° C.) and the index of rolling resistance than Comparative Preparation Example (wherein the copolymers of Comparative Examples 1-3 were used).

Thus, it was confirmed that the functional styrene-butadiene copolymer of the present disclosure is very suitable to be used for an industrial material for tires, belts, hoses, etc.

The introduction of the reactive polyol when polymerizing the styrene-butadiene copolymer according to the present disclosure results in improved silica affinity of the styrene-butadiene copolymer, thereby providing superior processability and tensile properties and remarkably improved dynamic properties. Therefore, when the functional styrene-butadiene copolymer of the present disclosure is used as a tire tread material, the hysteresis can be reduced, the tire wet traction can be improved, and the abrasion resistance can be enhanced.

The present disclosure has been described in detail with reference to specific embodiments thereof. However, it will be appreciated by those skilled in the art that various changes and modifications may be made in these embodiments without departing from the principles and spirit of the disclosure, the scope of which is defined in the appended claims and their equivalents.

What is claimed is:

1. A functional styrene-butadiene copolymer having a high affinity for silica selected from a group consisting of the compounds represented by Chemical Formulas 1 to 3:

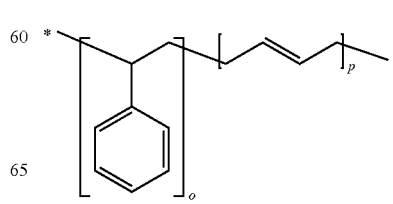

(1)

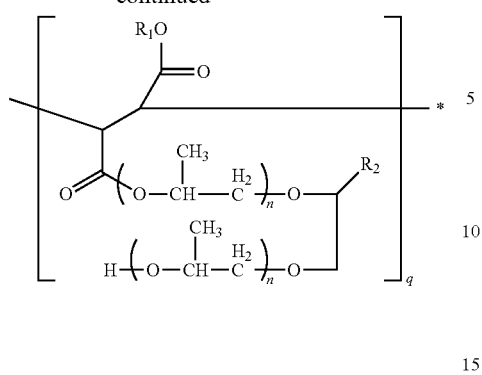

wherein o, p, and q are weight fractions, o is from 0.1 to 0.5, p is from 0.40 to 0.85, q is from 0.01 to 0.10, o+p+q=1, n is independently from 1 to 100, $R_1$ is hydrogen or hydroxyethyl, and $R_2$ is hydrogen or $CH_3$;

(2)

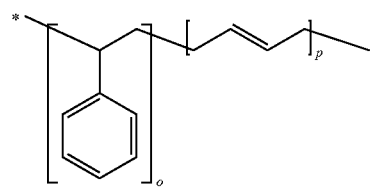

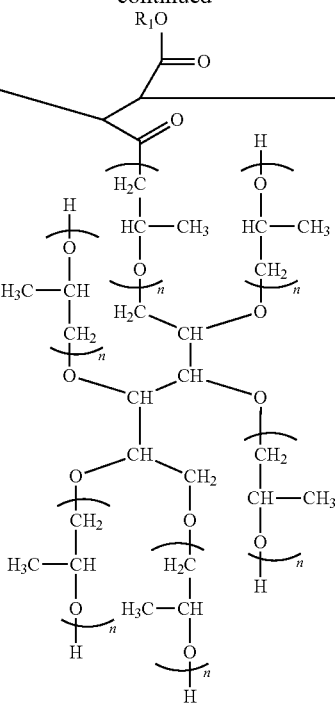

wherein o, p, and q are weight fractions, o is from 0.1 to 0.5, p is from 0.40 to 0.85, q is from 0.01 to 0.10, o+p+q=1, n is independently from 1 to 100, and $R_1$ is hydrogen or hydroxyethyl.

2. The functional styrene-butadiene copolymer according to claim 1, wherein the copolymer is prepared from polymerization of: styrene; butadiene; and one or more reactive polyol monomer(s) selected from the compounds represented by Chemical Formulas 4 to 6:

(4)

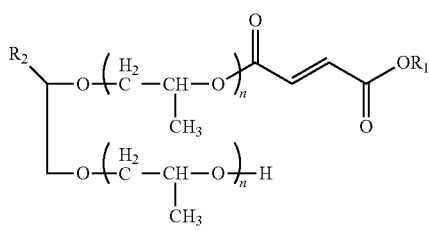

wherein n is independently from 1 to 100, $R_1$ is hydrogen or hydroxyethyl, and $R_2$ is hydrogen or $CH_3$;

(5)

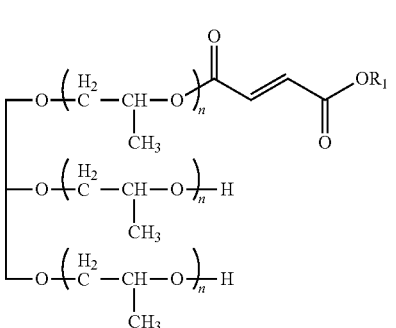

wherein o, p, and q are weight fractions, o is from 0.1 to 0.5, p is from 0.40 to 0.85, q is from 0.01 to 0.10, o+p+q=1, n is independently from 1 to 100, and $R_1$ is hydrogen or hydroxyethyl; and (3)

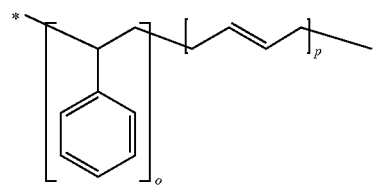

wherein n is independently from 1 to 100, $R_1$ and hydrogen or hydroxyethyl; and

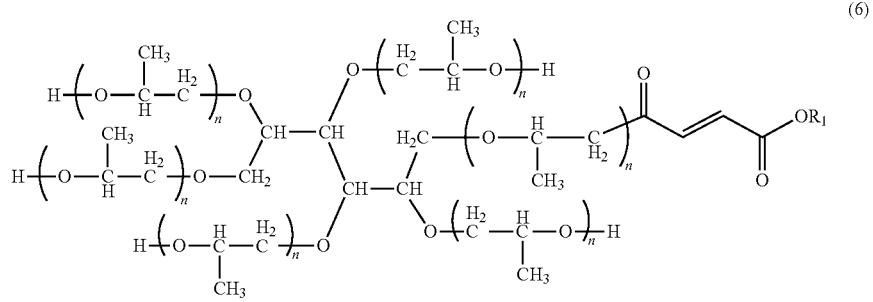

wherein n is independently from 1 to 100, and $R_1$ hydrogen or hydroxyethyl.

3. The functional styrene-butadiene copolymer according to claim 2, wherein the reactive polyol monomer represented by Chemical Formula 4, 5 or 6 has a weight-average molecular weight ($M_w$) from 300 to 30,000.

4. A silica composite which is a mixture of the functional styrene-butadiene copolymer of claim 1 with silica.

5. The silica composite according to claim 4, which is an industrial material for a tire, a hose or a belt.

6. A method for preparing a functional styrene-butadiene copolymer comprising polymerizing: styrene; butadiene; and one or more reactive polyol monomer(s) selected from the compounds represented by Chemical Formulas 4 to 6 in emulsion state:

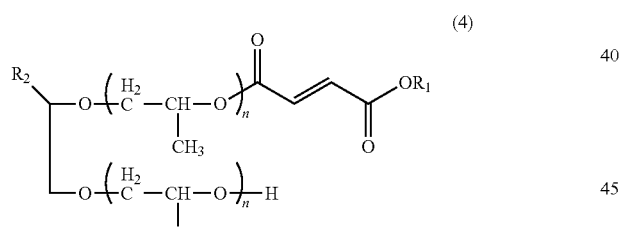

emulsion polymerization from acrylate monomers such as wherein n is independently from 1 to 100, $R_1$ is hydrogen or hydroxyethyl, and $R_2$ is hydrogen or $CH_3$;

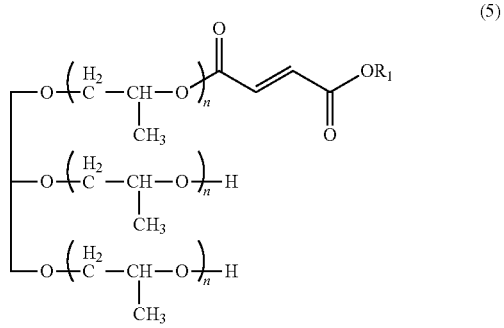

wherein n is independently from 1 to 100, $R_1$ and hydrogen or hydroxyethyl; and

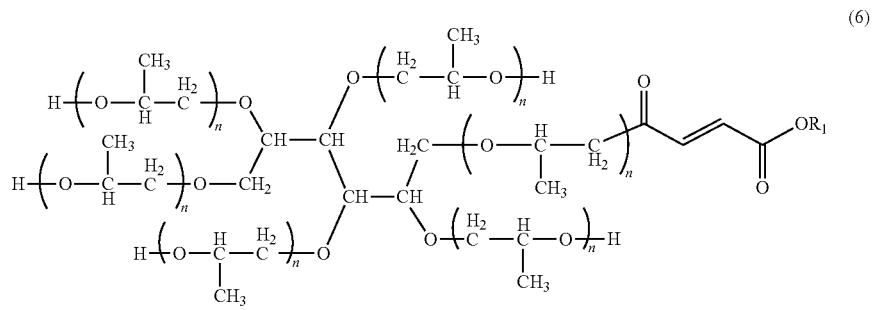

wherein n is independently from 1 to 100, and $R_1$ hydrogen or hydroxyethyl, and wherein the styrene-butadiene copolymer is represented by Chemical Formulas 1, 2 or 3:

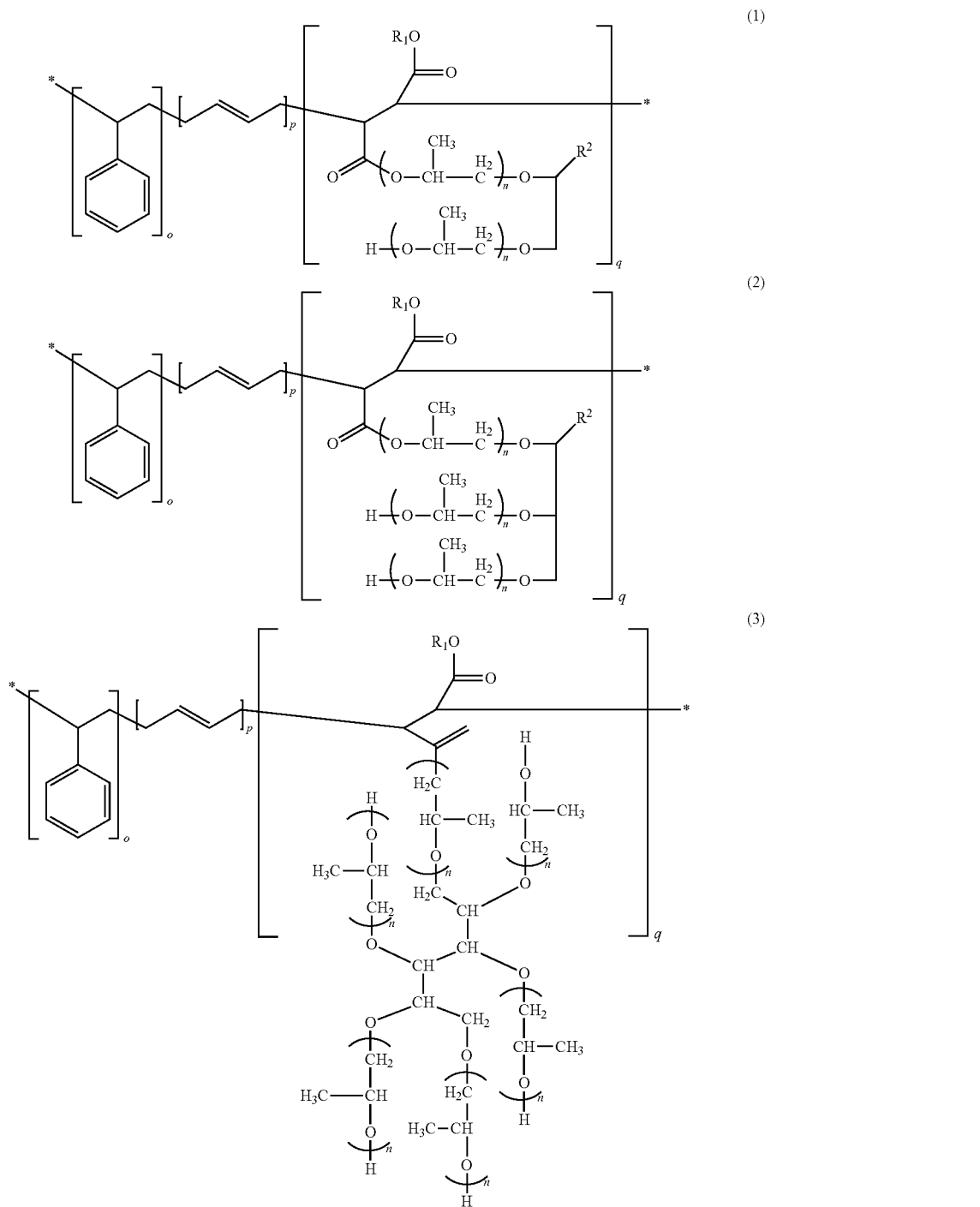

wherein o, p, and q are weight fractions, o is from 0.1 to 0.5, p is from 0.40 to 0.85, q is from 0.01 to 0.10, and o+p+q=1.

7. The method for preparing a functional styrene-butadiene copolymer according to claim 6, wherein the reactive polyol monomer represented by Chemical Formula 4, 5 or 6 is prepared from a reaction of a polyol selected from a group consisting of a mixture of sugar and glycerin, sorbitol, a mixture of sugar and pentaerythritol, glycerin, propylene glycol and ethylene glycol with an alkylene oxide.

* * * * *